June 29, 1965     R. J. FRITZ     3,191,523
FRUIT AND VEGETABLE JUICER

Filed June 28, 1963     3 Sheets-Sheet 1

INVENTOR.
ROY J. FRITZ
BY
ATTORNEY

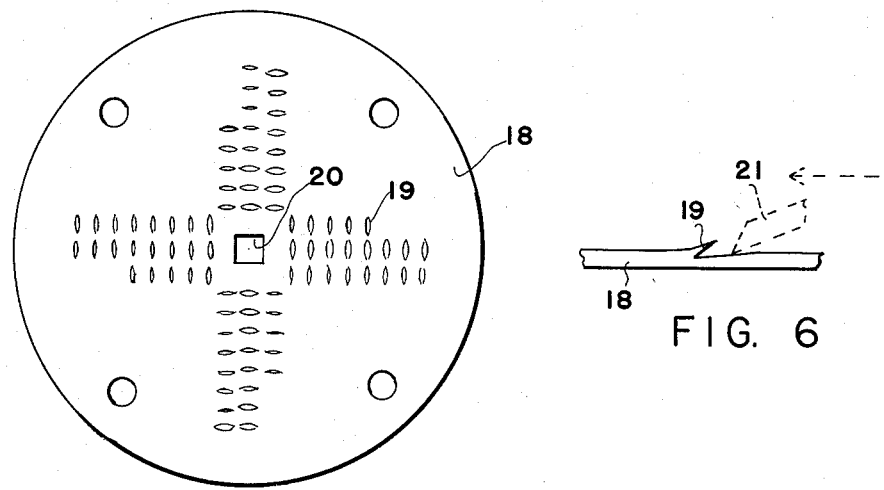
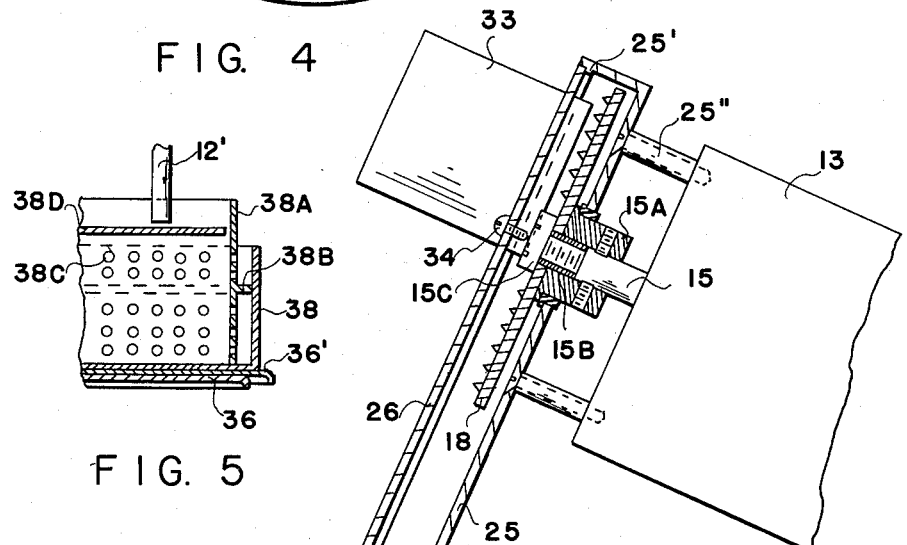

United States Patent Office

3,191,523
Patented June 29, 1965

3,191,523
FRUIT AND VEGETABLE JUICER
Roy J. Fritz, 2831 Finley Ave., Cornwells Heights, Pa.
Filed June 28, 1963, Ser. No. 291,369
2 Claims. (Cl. 100—97)

This invention relates to improved apparatus for extracting filtered, pulp-free juice from fresh fruits and vegetables such as apples, grapes, carrots and celery; and the present application is a continuation-in-part of my application Serial No. 202,280, filed June 13, 1962, which is abandoned. The general object of the invention is to provide improved apparatus for this purpose which while being capable of being embodied in a small size for home use, for example, is nevertheless of substantial capacity and capable of processing uncut fruits and vegetables. Thus, the machine is capable of receiving whole apples and whole bunches of celery, for example, and comminuting the same into juicy pulp at a very high rate of speed prior to an expressing operation to separate the liquid from the fibrous material of the pulp. To this end, the invention comprises comminuting apparatus of improved design and positionally related, in an improved manner, to the overall assembly of the machine and particularly to the expressing receptacle.

An important feature of the invention is that in a unitary assembly of a comminuting device and a press the arrangement is such that the comminuted materials are discharged directly into a leak-proof receptacle which is used in the press. This minimizes handling of the materials and makes for more orderly operation of the assembly.

Another object of the invention is the provision of an improved physical relation of the various required components of apparatus to extract filtered pulp-free juice from fresh fruits and vegetables whereby such apparatus may be readily made in varying sizes for either home or commercial use without sacrificing any of the advantageous principles of the asembled apparatus. Further objects include the provision of an improved comminuting device which may be readily used to produce shredded coconut, horse-radish and similar products, and the provision of an improved press which is of high capacity, readily loaded from the comminuting apparatus, and capable of exerting a very high unit pressure on the pulp while yet allowing the free flow of juice from the machine and while yet preventing contamination of the juice flowing from the machine with any fibrous component of the pulp.

A further object of the invention is the provision of an improved apparatus for the purpose indicated which may be readily disassembled for cleaning purposes and which may be largely manufactured from sanitary stainless sheet by simple stamping operations.

The above and other objects and advantages of the invention will become apparent upon consideration of the following specification and the accompanying drawing wherein there is disclosed a preferred embodiment of the invention.

In the drawing:

FIGURE 3 is a sectional view of the rotary cutter element of the comminuting device and of the housing enclosing such element;

FIGURE 4 is a plan view of the rotary cutting element of FIGURE 3;

FIGURE 5 is a fragmentary sectional view taken along the line V—V of FIGURE 1; and FIGURE 6 is a detail view showing a possible method of making the cutting teeth on the rotary cutting element of FIGURE 3.

Figure 2:
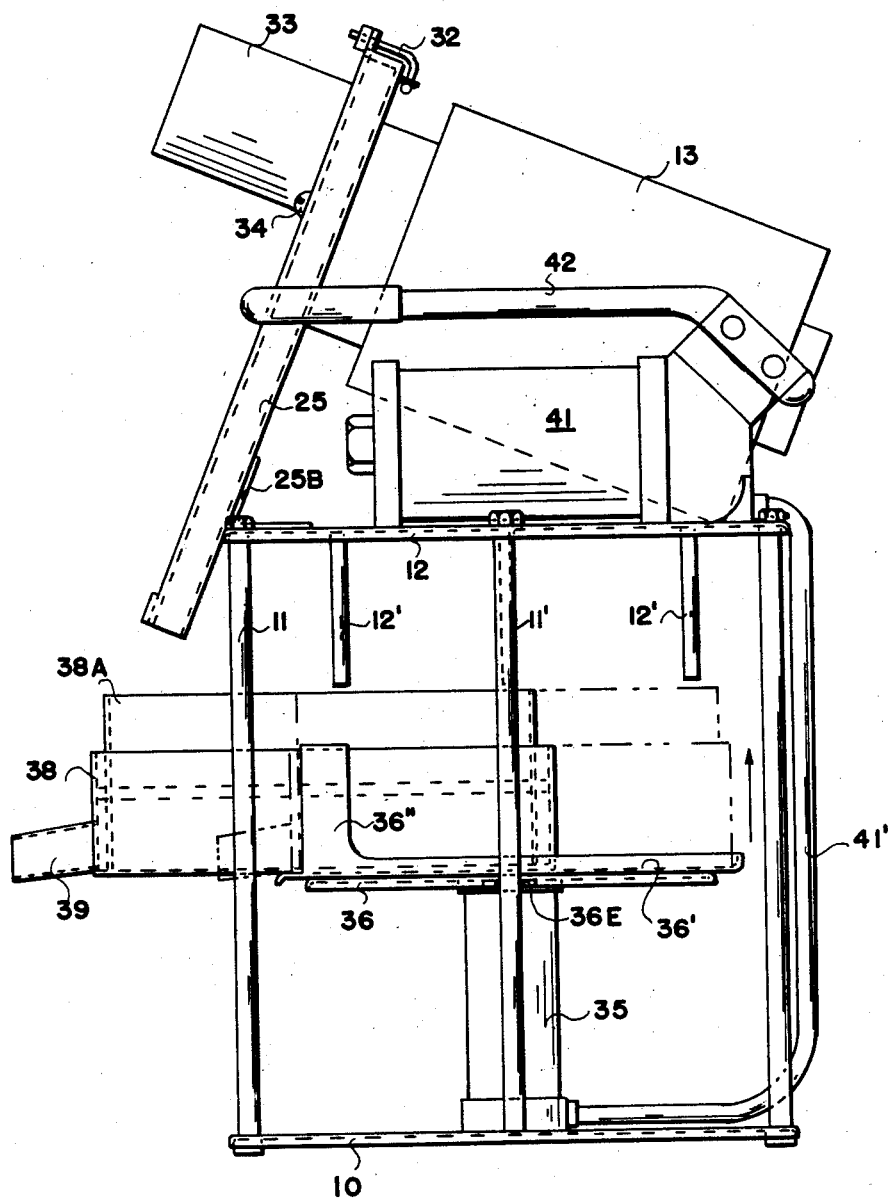
FIGURE 2 is a side elevation of the apparatus of FIGURE 1 showing the pulp and juice tray slid partially out of the machine into position for receiving pulp and juice coming from the comminuting apparatus.

In the illustrated embodiment of the invention, reference numeral 10 designates a base rigidly mounting a plurality of posts 11 which in turn support an upper platform 12. The plates 10 and 12 are suitably flanged and ribbed, as shown, for strength, and in actual practice are preferably stamped from stainless steel sheets. A comminuting device comprising a unitary assembly of an electric motor 13, a rotary cutting disc 18, and a pan-like housing 25 is supported on the platform 12, being fixed thereon by brackets 25B which are detachably secured to the platform. Housing 25 is open along its bottom end and, for a purpose to be later described, projects downwardly beyond the platform 12. This housing is rigidly connected to the forward end of the frame of the motor 13 by means of screws and spacers 25", and to facilitate feeding of raw stock as well as to dispense with any additional support for the motor the assembly of the motor 13 and housing 25 is tilted as shown in FIGURE 2.

Motor 13 has a projecting drive shaft 15 onto which is rigidly fixed a coupling 15A. Sweated into this coupling 15A is a sleeve 15B which is internally bored and threaded and which is squared in the axial outer portion of its outer periphery. This square projection of the sleeve 15B receives the centrally disposed square aperture 20 of the cutting disc 18, and a wide-headed cap screw 15C threaded into the sleeve 15B is provided to lock the cutting disc in position. It is thus apparent that the motor shaft 15 operatively mounts the cutting disc 18 for rotation at high speed.

Fitting within the outer face of housing 25 and lying against a rib 25' formed on the side wall of the housing is a cover plate 26, the lower end of which is secured by inwardly directed tabs 29 carried by said side wall. The upper end of plate 26 is detachably secured by a releasable latch 32 (FIGURE 2). Rigidly secured to and extending at right angles through the plate 26 is a feed tube 33 mounted to one side of the axis of rotation of the cutter disc and having its inner edge closely adjacent to the paths of movement of the cutting teeth 19 of this disc. A screw 34 threadedly mounted in the plate 26 and having its inner end riding on the center of the screw 15C is provided to insure that the inner face of sleeve 33 remains away from the teeth 19 the proper desired distance. It should be obvious that with the motor 13 energized, the placing of any fruit or vegetable in the feed tube 33 will result in rapid comminution of the fruit or vegetable and discharge of the product through the open bottom end of the housing 25. In accordance with the principles of this invention, such discharge (which may be at high speed) takes place directly into a press receptacle now to be described.

Centrally supported on the base plate 10 is an upstanding hydraulic cylinder 35 whose rod or ram, not shown, mounts a flanged and ribbed platen 36 also preferably stamped from a stainless steel sheet. Platen 36 has forked ears 36E for slideable guiding on certain (11') of the posts 11 (FIG. 1), and a pair of tension springs 36S interposed between the base 10 and the platen 36 are provided to bias the latter to downward position.

Figure 1:
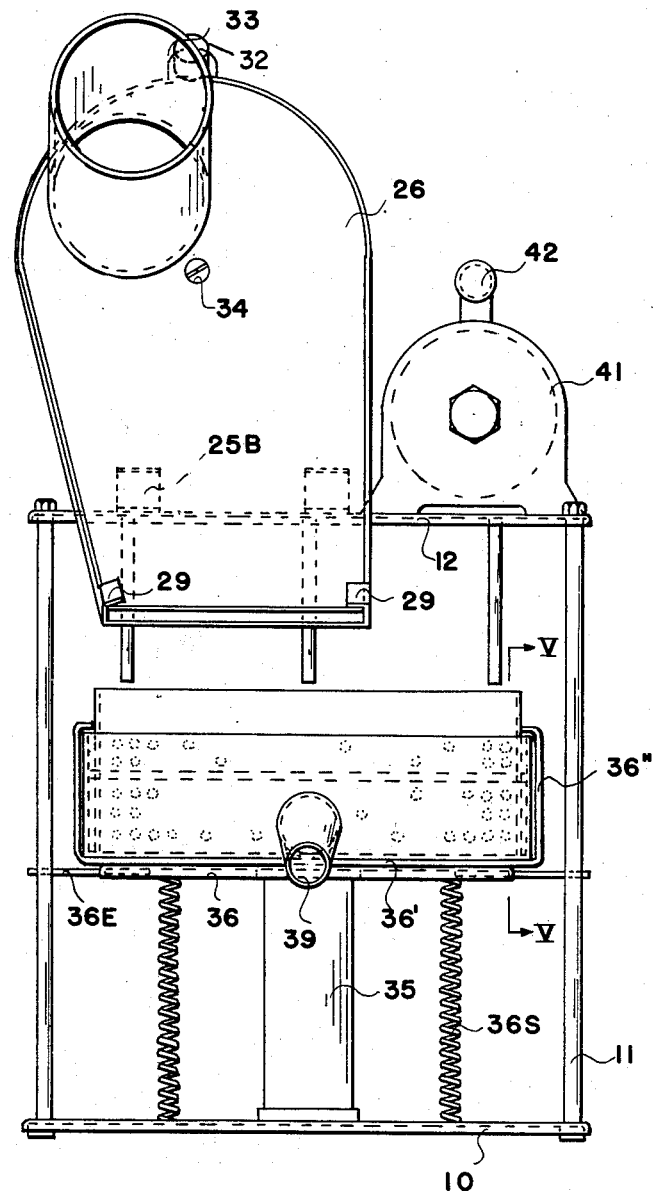
FIGURE 1 is a front elevation of a fruit and vegetable juicer constructed according to the principles of my invention.

Resting on the platen 36 and secured thereto is a plate 36' having a downwardly bent front flange and upwardly bent side and rear flanges as shown in FIGURE 2. Forward portions of these side flanges are vertically extended as shown at 36" with the upper end portions of these extensions being bent inwardly toward each other to form C-shaped guides as shown in FIGURE 1. Slideably received on the plate 36' and received within the guides 36" and between the side flanges of the plate 36' is a fluid-tight tray 38 which is open at its top and which is provided at its front end with a discharge nozzle 39. As shown in FIGURE 2, the tray 38 is readily slideable from an inner position concentric with the cylinder 35 to a forward outer position wherein the front wall of the tray is well forward of the discharge bottom end of the comminutor housing 25. The hook-like guides 36" prevent the downward tilting of the tray when the same is in forward position and the rear flange on the plate 36' indexes the rear position of the tray.

Fitting within the tray 38 is a sheet metal frame or cage 38A open at its top and bottom and having an encircling rib 38B on the outer surface of its side wall fitting snugly within the tray. This rib 38B is a strengthening rib to resist outward bulging of the cage and tray when pulp material contained in the frame is subjected to expressing pressure. The side wall of frame 38A is formed with a multiplicity of spaced small-diametered apertures 38C which are all located well below the upper rim of the tray 38. The purpose of the latter feature is to contain any squirtings which may issue from the apertures 38C upon the application of expressing pressure. To close off the top of the pressing compartment, I provide a loose plate 38D which, in practice, simply lies on top of the bulk of the comminuted material to be pressed and which upon upward movement of the tray 38 and the frame 38A is adapted to be engaged by a plurality of spaced pins 12 which depend from the platform 12.

For actuating cylinder 35, I provide a reservoir for operating oil and a source of pressure thereof comprising a small combined manual pump and reservoir 41 mounted on the platform 12 beside the motor 13. This unit is provided with an operating handle 42 readily accessible from a position in front of the machine, and is connected to cylinder 35 by means of conduit 41'.

Considering now the operation of the assembly described above, the tray 38 with the press cage 38A is slid forwardly a sufficient extent to receive the downwardly flowing comminuted pulp issuing from the cutter housing 25. Press cage 38A is overlaid with a large piece of nylon cloth which is depressed sufficiently in its central portion to overlie the inner surfaces of the side walls of the cage and the bottom wall of the tray 38. The motor 13 may now be started by actuation of a switch, not shown, which causes the comminuting disc 18 to revolve at high speeds—3400 r.p.m., for example. The celery, carrots or other vegetable or fruit desired to be processed is now fed into the feed tube 33 and is rapidly and minutely comminuted by the cutting burrs or teeth 19 on the disc 18. The disc 18 revolves in a counter-clockwise direction, as viewed in FIGURE 1, so the comminuted material is forcibly projected downwardly directly into the cloth-lined cage 38A. In actual practice, the feed tube is made quite large—3" in diameter—so that whole bunches of carrots and celery and whole large apples, for example, may be fed into the machine without pre-cutting. This, in itself, is advantageous since it lessens the work involved and reduces any initial loss of juice which may occur in the pre-cutting of the fruit or vegetable. The action of the comminuting device is extremely rapid and extremely fine because of the high speed at which the disc 18 revolves and because of the close clearance (of the order of .01") maintained between the cutting burrs 19 and the inner edge of the feed tube 33. This substantially complete breakdown of the fleshy or fibrous structure of the food being processed releases all of the juices thereby facilitating greatly the subsequent pressing operation. Of course, a collecting pan is placed under the spout 39 during loading of the cage 38A.

After all of the food has been comminuted the side and end edge portions of the cloth are folded onto the top of the pulp contained within the cage 38A, which pulp may have been previously spread by a large tablespoon or by the inoperative end of the special flat wrench, not shown, provided to remove screw 15C. The cloth is folded to be contained within the inner surfaces of the side walls of the cage 38A, after which the plate 38D is applied and the tray 38 slid rearwardly to position the cage and plate directly under the lower ends of depending rods 12'. With the parts thus properly positioned, the pump 41 is actuated to cause the ram in cylinder 35 to raise the movable platen 36 and thereby subject the cloth encased pulp in the cage 38A to the pressing action of the plate 38D. The perforations in the side walls of the cage 38A provide a large number (432, for example) of small (7/64" diameter, for example) apertures which results sufficient total cross-sectional area for the rapid outflow of juice. This is particularly true since all of the outlet ends of these apertures are spaced inwardly from any object as, for example, the side walls of the tray 38. The press is therefore of large capacity and very quick acting. The small diameter of the apertures or holes in the side walls of the cage 38A prevents any excessive bulging or tearing of the nylon filter cloth, and as a result the juice collected by the tray 38 and ejected by the spout 39 is entirely free of any fibrous or pulpous material.

The cutting disc 18, along with the parts 25, 26, 33, 38, 38A and 38D, is made of stainless steel and the teeth 19 are preferably upset directly out of the parent metal of which the disc is made. One method of doing this is illustrated in FIGURE 6 wherein the barb-like tooth 19 is formed by the skiving and cutting action of a sharpened tool bit 21. The pattern of the teeth on the disc is preferably like that shown in FIGURE 4 wherein a greater number of teeth are grouped toward the axis of rotation to compensate for the lower speed of travel of these radially inward teeth.

It should now be apparent that I have provided an improved combination comminuting device and press primarily for extracting juice from fruits and vegetables which accomplishes the objects initially set out. Both the comminuting device and the press are very efficient and of substantial capacity even though made in small sizes for home use. The physical or positional arrangement of the parts is very simple and compact and allows the comminuting device to discharge material directly into the press cage. So long as a suitable receptacle is kept under the spout 39 no juice whatever is lost even during the comminuting cycle and, of course, as stated above since the feeding inlet will take full size and uncut pieces or bunches of fruit or vegetables there is no loss of juice prior to the comminuting cycle. The juice product is absolutely pure and clear, entirely free of any pulp or fibrous lint, and as such may be stored for long periods of time under refrigeration without loss of color, texture, or homogenity. The apparatus is also useful for merely cuttings or shredding such ingredients as coconut, horse-radish, when it is not desired to extract the juice therefrom. Adjustment of the fineness or the coarseness of the product may be made by moving the screw 34 inwardly or outwardly as will be understood.

Other advantageous features of the apparatus of the invention includes the structural arrangement whereby the complete assembly may be manufactured largely from standard components and from stampings made from stainless steel sheet. Also, the structural arrangement is such that the apparatus may be most efficiently operated entirely from the front of the machine. The downwardly inclined orientation of the feed tube 33 facilitates feeding of the raw fruits or vegetables and the resulting gravity action retains pieces in cutting contact with the disc 18 until all the bulk of the pieces is consumed.

The above specifically described embodiment of the invention should be considered as illustrative only since obviously many changes may be made therein without departing from the spirit or scope of the invention.

I claim:

1. A portable fruit and vegetable juicer comprising a supporting structure having a base and an upwardly spaced platform, a horizontally disposed press platen slideably mounted for vertical movement between said base and platform, means positioned between said base and platen to raise and lower said platen, a removable open-topped pulp-receiving pan loosely and slideably mounted on said platen and having a forwardly disposed pouring spout extending outwardly of the general periphery of said structure, said pan being slideable fore and aft on said platen, a press cage open at the top and having perforated side walls positioned in said pan with the side walls of the cage spaced inwardly from the side walls of the pan, a loose plate to overlie the pulp in said cage, depending means carried by said platform to enter said cage and engage said plate upon upward movement of said platen and pan carried thereby, a motor-driven rotary comminuting device supported on said platform and having a flat and generally vertically disposed housing with a downwardly directed discharge nozzle aimed into said cage when said pan and cage are slid forwardly, a removable front cover for said housing, said housing cover having an enlarged opening therein eccentric of the axis of rotation of said rotary comminuting device, and a feed tube carried by and extending forwardly of said cover concentrically about said opening, the arrangement being such that with said plate removed and said pan and cage slid forwardly pulp may be discharged directly from said housing into said cage with the free juice thereof collected from said spout after which said plate may be put into position and said pan and cage slid back to pressing position while juice is continued to be collected from said spout.

2. Apparatus according to claim 1 further characterized in that said means to raise and lower said platen comprises a vertically disposed hydraulic cylinder interposed between said base and platen, and further including a hydraulic pump for powering said cylinder mounted on said platform in side-by-side relation to said comminuting means.

References Cited by the Examiner

UNITED STATES PATENTS

| | | | |
|---|---|---|---|
| 214,560 | 4/79 | Gettmann | 100—127 X |
| 697,251 | 4/02 | Hubbell | 100—127 X |
| 2,068,013 | 1/37 | Fridlender et al. | 100—96 X |
| 2,154,650 | 4/39 | Wishinsky | 146—114 X |
| 2,460,901 | 2/49 | Newman | 146—177 |
| 2,477,198 | 7/49 | Murray | 146—177 |
| 2,550,895 | 5/51 | Weismuller | 146—177 |
| 2,610,574 | 9/52 | Winson | 100—96 |
| 2,711,642 | 6/55 | Meyer | 100—127 X |
| 2,901,015 | 8/59 | Swenson et al. | 146—177 X |

FOREIGN PATENTS 29,203 1911 Great Britain.

WALTER A. SCHEEL, *Primary Examiner.*